US012463341B2

(12) United States Patent
Cheng et al.

(10) Patent No.: US 12,463,341 B2
(45) Date of Patent: Nov. 4, 2025

(54) MULTI-BAND, SHARED-APERTURE, CIRCULARLY POLARIZED PHASED ARRAY ANTENNA

(71) Applicant: Univ. Electronic Science & Technology of China, Chengdu (CN)

(72) Inventors: Yujian Cheng, Chengdu (CN); Ruisen Hao, Chengdu (CN); Jinfan Zhang, Chengdu (CN); Zongrui He, Chengdu (CN); Tingjun Li, Chengdu (CN); Haining Yang, Chengdu (CN); Hongbin Wang, Chengdu (CN); Yong Fan, Chengdu (CN); Yafei Wu, Chengdu (CN); Minghua Zhao, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 415 days.

(21) Appl. No.: 18/164,023

(22) Filed: Feb. 3, 2023

(65) Prior Publication Data

US 2023/0369760 A1 Nov. 16, 2023

(30) Foreign Application Priority Data

May 11, 2022 (CN) ......................... 202210508578.2
Jun. 21, 2022 (CN) ......................... 202210701549.8

(51) Int. Cl.
*H01Q 9/04* (2006.01)
*H01Q 3/36* (2006.01)
(Continued)

(52) U.S. Cl.
CPC ............ *H01Q 3/36* (2013.01); *H01Q 9/0428* (2013.01)

(58) Field of Classification Search
CPC .......... H01Q 1/38; H01Q 21/00; H01Q 21/06; H01Q 21/065; H01Q 21/067; H01Q 21/22;
(Continued)

(56) References Cited

U.S. PATENT DOCUMENTS 9,379,492 B2 6/2016 Zebhauser et al.
9,472,859 B2 * 10/2016 Dang ................. H01Q 21/0075
(Continued)

FOREIGN PATENT DOCUMENTS

CN 104795638 A 7/2015
CN 205509015 U 8/2016
(Continued)

OTHER PUBLICATIONS

Ding et al., "A Design of K/Ka Dual-Band Shared-Aperture Array Antenna with High Isolation," 2018 International Workshop on Antenna Technology.

*Primary Examiner* — Tho G Phan
(74) *Attorney, Agent, or Firm* — Central California IP Group, P.C.; Andrew D. Fortney

(57) ABSTRACT

A multi-band, shared-aperture, circularly polarized phased array antenna relating to the field of antenna technology is disclosed. Specifically, two multi-band, shared-aperture, circularly polarized phased array antenna designs are disclosed. By integrating multiple circularly polarized endfire antennas with different operation bands into one aperture, a shared-aperture antenna array is achieved. The bandwidth and crossband port isolation of this antenna are enhanced, and the antenna also has the properties of miniaturization, feasibility, and ease of connection with circuits.

11 Claims, 9 Drawing Sheets

(51) Int. Cl.
*H01Q 21/00* (2006.01)
*H01Q 21/06* (2006.01)

(58) Field of Classification Search
CPC ...... H01Q 21/24; H01Q 25/00; H01Q 25/001; H01Q 3/36; H01Q 5/42; H01Q 9/04; H01Q 9/0428
See application file for complete search history.

(56) References Cited

U.S. PATENT DOCUMENTS

| | | | | |
|---|---|---|---|---|
| 11,011,853 | B2 * | 5/2021 | Corman | H01Q 1/245 |
| 11,108,124 | B2 * | 8/2021 | Zhu | H01Q 21/065 |
| 11,283,174 | B2 * | 3/2022 | Cho | H01Q 9/0414 |
| 11,545,761 | B2 * | 1/2023 | He | H01Q 25/001 |
| 11,916,298 | B2 * | 2/2024 | Zhang | H01Q 3/267 |
| 11,962,092 | B2 * | 4/2024 | Jia | H01Q 1/243 |
| 12,316,032 | B2 * | 5/2025 | Jiang | H01Q 13/206 |
| 2020/0021041 | A1 | 1/2020 | Artemenko et al. | |
| 2020/0136234 | A1 | 4/2020 | Paulotto et al. | |
| 2021/0091809 | A1 | 3/2021 | Evtyushkin et al. | |

FOREIGN PATENT DOCUMENTS

| | | | |
|---|---|---|---|
| CN | 106299618 | A | 1/2017 |
| CN | 106356622 | A | 1/2017 |
| CN | 106785408 | A | 5/2017 |
| CN | 107394377 | A | 11/2017 |
| CN | 107910642 | A | 4/2018 |
| CN | 108258422 | A | 7/2018 |
| CN | 108615974 | A | 10/2018 |
| CN | 109860994 | A | 6/2019 |
| CN | 109904599 | A | 6/2019 |
| CN | 110112560 | A | 8/2019 |
| CN | 112332105 | A | 2/2021 |
| CN | 112803146 | A | 5/2021 |
| CN | 113054425 | A | 6/2021 |
| CN | 113097716 | A | 7/2021 |
| CN | 113391272 | A | 9/2021 |
| CN | 113809556 | A | 12/2021 |

* cited by examiner

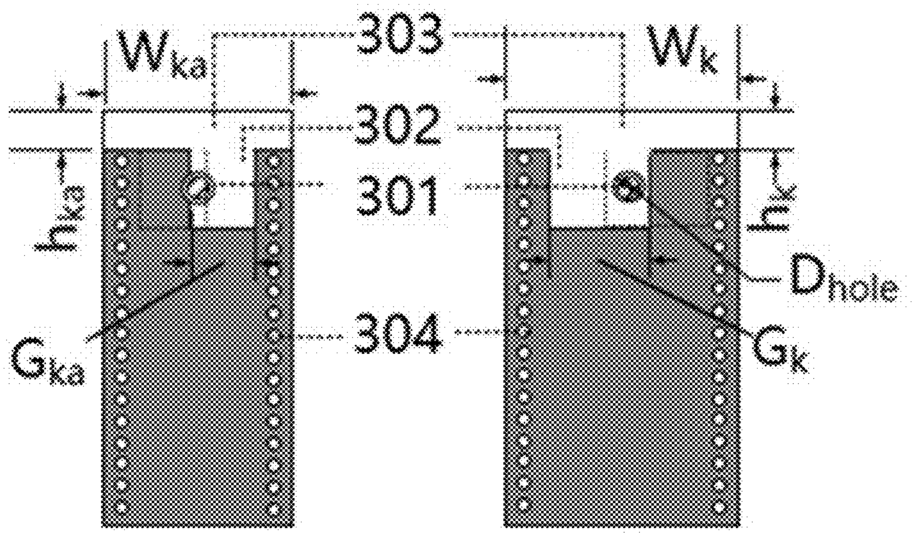
FIG. 3A
FIG. 3B
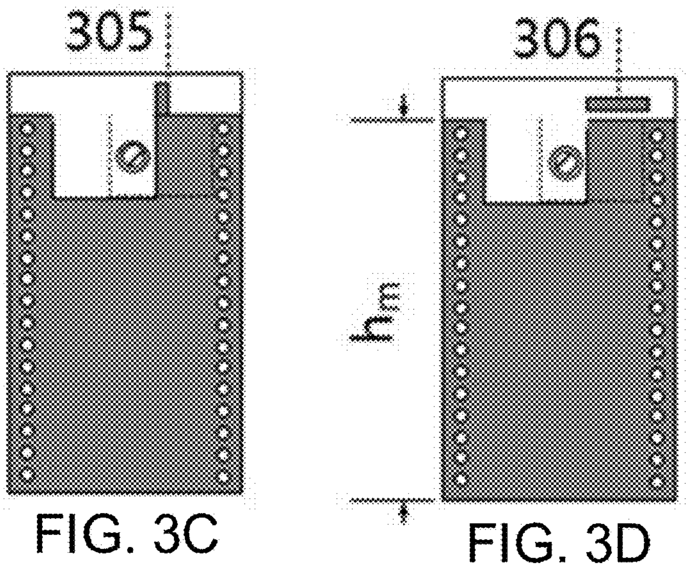
FIG. 3C
FIG. 3D
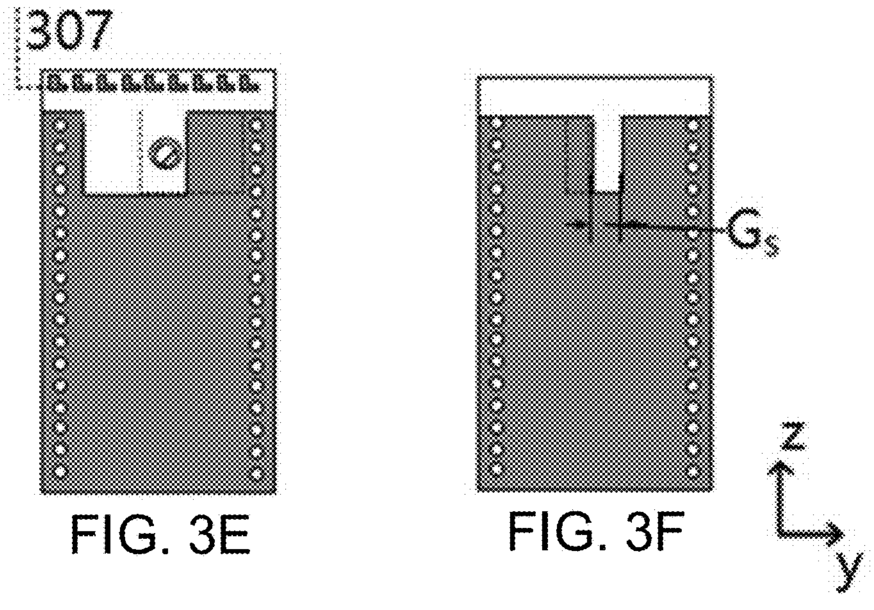
FIG. 3E
FIG. 3F

MULTI-BAND, SHARED-APERTURE, CIRCULARLY POLARIZED PHASED ARRAY ANTENNA

TECHNICAL FIELD

This disclosure relates to the field of antenna technology. Specifically, it involves a multi-band, shared-aperture, circularly polarized phased array antenna.

BACKGROUND

In recent years, as personal communication equipment renewal is speeding up, the amount of base station communication equipment is rapidly increasing, low earth orbit satellite constellations are in fast construction and deployment, and advanced detecting equipment is becoming more widespread to public. All of these developments and progressions lead to expectations of equipment with smaller volume, lighter weight, and more functions. However, conventional equipment with antennas requires a minimum of one or two antennas for functionality. Therefore, multi-functional systems usually show bulky profiles. If one antenna fulfills multiple functions, or many antennas are integrated into one aperture, the system volume and weight can be significantly reduced.

Driven by urgent needs, a shared-aperture antenna becomes a hot spot of academic and industry. With both academic and engineering values, plenty of research articles and product inventions flourish. A shared-aperture antenna may become the main form of future wireless systems. This may boost the progress of miniaturization, lighter weight, and higher integration for communication and detection equipment. Finally, these properties will further lower the barrier for application of multi-functional communication or detection equipment, which will benefit the popularization of such equipment.

Although with such advantages and bright future, shared-aperture phased array antennas still have many technical bottleneck problems, such as those disclosed in Chinese patent CN201910094604.X, "K/Ka dual band shared-aperture antenna array." The high density of antenna elements makes it difficult to arrange the circuit in planar distributions. Besides, the antenna has a low crossband port isolation, due to the absence of an integrated filter structure.

SUMMARY

Aiming at the problems in the existing approach, this invention discloses a multi-band, shared-aperture, circularly polarized phased array antenna. By integrating many circularly polarized phased array antennas with different operation bands into one aperture, a shared-aperture antenna array is achieved. The bandwidth and crossband port isolation of this antenna are enhanced, and the antenna also has the properties of miniaturization, feasibility, of ease of connection with various circuits.

The technical scheme is as follows:

A multi-band, shared-aperture, circularly polarized phased array antenna comprises a plurality of linear array groups, periodically spaced or arranged along a first (e.g., an x) direction. Each linear array group comprises N types of circularly polarized endfire linear arrays, arranged along the first direction, optionally with the same distance or spacing (e.g., between adjacent ones of the endfire linear arrays). The N types of circularly polarized endfire linear arrays are integrated, to form or construct a shared-aperture antenna. In most instances, N is an integer of at least two or three.

Each of the circularly polarized endfire linear arrays comprises a plurality of circularly polarized endfire antenna elements, periodically spaced along a second (e.g., a y) direction. The second direction is orthogonal to the first direction. The antenna elements radiate (e.g., broadcast or reflect a signal) in a third (e.g., a z) direction. The third direction is orthogonal to each of the first and second directions.

The multi-band, shared-aperture, circularly polarized phased array antenna further comprises a plurality of rectangular metal blocks, each between adjacent ones of the circularly polarized endfire linear arrays. The rectangular metal blocks may function as a crossband decoupling structure. Two sides of the rectangular metal blocks are connected to or bonded with the adjacent circularly polarized endfire linear arrays to decouple horizontal polarization components (e.g., of the adjacent circularly polarized endfire linear arrays).

The circularly polarized endfire antenna elements are centrosymmetric around a central axis along the third direction (e.g., the z-direction). Each of the circularly polarized endfire antenna elements comprises a rectangular substrate, a top metal layer covering a top face of the rectangular substrate, a bottom metal layer covering a bottom face of the rectangular substrate, and two columns of metal via arrays. A bare substrate area having the same width as the rectangular substrate is elongated along the third direction. "Bare substrate" means there is no metal layer covering the substrate. The two columns of metal via arrays are on the opposite sides of the circularly polarized endfire antenna element. The extension direction of the metal vias in the metal via array is along the third direction. The function of the metal via array is to electrically connect the top metal layer and the bottom metal layer. Both the top metal layer and the bottom metal layer have rectangular notches toward the third direction. Projections of (or from) the two rectangular notches may be in the first direction and are partially staggered.

Since the projections of the two rectangular notches are partially staggered, a metal dowel may be at the center of the projection area. The metal dowel is not electrically connected to the top metal layer or the bottom metal layer.

In some embodiments, each of the rectangular metal blocks (e.g., the crossband decoupling structures) further comprises a metal slab or a metal grating. The metal slab or metal grating may have one end towards the third direction, and another end connected to the corresponding rectangular metal block. The metal slabs and the metal grating are configured to further enhance the decoupling effect (e.g., for the horizontal polarization component).

In another embodiment, the multi-band, shared-aperture, circularly polarized phased array antenna further comprises a dielectric radome (e.g., in the radiation direction of the shared-aperture phased array antenna). The dielectric radome comprises a dielectric slab, a plurality of upper bulges on one face of the dielectric slab, and a plurality of lower bulges on an opposite face of the dielectric slab. The upper and lower bulges are distributed periodically and alternately. These bulges are configured to enhance the transmission performance of the dielectric radome and reduce the height of the antenna system effectively. For example, the dielectric radome may have good transmission performance in the near field region.

The invention also includes another multi-band, shared-aperture, circularly polarized phased array antenna, which includes a plurality of dielectric substrate layers, a K-band metal patch array, a Ka-band metal patch array, a K-band filter and a Ka-band filter.

The plurality of dielectric substrate layers include, in succession, a first metal ground, a first dielectric substrate layer, a second dielectric substrate layer, a second metal ground, a third dielectric substrate layer, a fourth dielectric substrate layer, a third metal ground, a fifth dielectric substrate layer, a fourth metal ground, a sixth dielectric substrate layer, a seventh dielectric substrate layer, a fifth metal ground, an eighth dielectric substrate layer, a ninth dielectric substrate layer, a tenth dielectric substrate layer and a eleventh dielectric substrate layer (e.g., from top to bottom).

The other multi-band, shared-aperture, circularly polarized phased array antenna may further comprise a ball grid array (BGA; comprising an array of metal [e.g., solder] balls), configured to connect the first metal ground (e.g., a lower surface thereof) and optionally a remainder of the dielectric substrate to an external surface or device, such as a printed circuit board (PCB) or a chip (e.g., an integrated circuit). An opposite surface (e.g., the upper surface) of the first metal ground includes a first metal via and a second metal via. The fifth metal ground, the fourth metal ground, the third metal ground and the second metal ground are connected through the first metal via; the BGA, the fourth metal ground, the third metal ground and the second metal ground are connected through the second metal via.

The other multi-band, shared-aperture, circularly polarized phased array antenna may further comprise a Ka-band power divider, which may have a metal layer between the first dielectric substrate layer and the second dielectric substrate layer. The other multi-band, shared-aperture, circularly polarized phased array antenna may further comprise a third metal via on an upper surface of the metal layer of the Ka-band power divider, and a fourth metal via on a lower surface of the metal layer of the Ka-band power divider. The other multi-band, shared-aperture, circularly polarized phased array antenna may further comprise a Ka-band metal patch array, which may pass through or be connected through the third metal via, and connected with the BGA by or through the fourth metal via.

The upper surface of the third metal ground may include a fifth metal via, and the third metal ground and the fourth metal ground are connected through the fifth metal via.

The fourth metal ground may include a K-band feeder. The K-band feeder can feed (e.g., transmit or broadcast) K-band radiation through or using a plurality of cross slots on or in the fifth metal ground.

The cross slots on or in the fifth metal ground may be directly below the K-band metal patch array, and each cross slot corresponds one-to-one to a single metal patch in the K-band metal patch array.

The sixth metal layer may be on an upper surface of the third dielectric substrate layer, and the second metal via may be connected to the sixth metal layer.

The K-band metal patch array may be on the upper surface and the lower surface of the tenth dielectric substrate layer. The third metal via connects the Ka-band metal patch with the metal layer of the Ka-band power divider, and the projection of each metal patch in the Ka-band metal patch array on the tenth dielectric substrate layer does not coincide with the projection of each metal patch in the K-band metal patch array on the tenth dielectric substrate layer.

The K-band filter may comprise a first K-band filter and a second K-band filter. The first K-band filter can be in any of the second metal ground, the sixth metal layer, the third metal or the fourth metal ground layers. The second K-band filter may be in the metal layer of the Ka-band power divider. The Ka-band filter may include a first Ka-band filter and a second Ka-band filter. The first Ka-band filter may be on the K-band feeder. The second Ka-band filter may be on the second metal ground or the sixth metal layer. When the first K-band filter is on the fourth metal ground, it does not contact the K-band feeder or the second Ka-band filter.

Further, the K-band metal patch array may include a plurality of metal patch elements with a fixed spacing therebetween. Each metal patch in the plurality of metal patch elements may be identical to other metal patches in the plurality of metal patch elements. The spacing between adjacent ones of the metal patch elements is greater than zero. There may be 4 metal patches in each metal patch element, and the center points of the 4 metal patches may be on the 4 vertices of a square. The Ka-band metal patch array and the K-band metal patch array may be configured similarly or identically.

Further, the projection of the K-band metal patch array on the tenth dielectric layer may be in the same region as that of the Ka-band metal patch array on the tenth dielectric layer. The patch element of K-band metal patch array may be the first patch element, and the patch element of Ka-band metal patch array may be the second patch element. The second metal patch element may be nested within the first metal patch element, and the four vertices of the second metal patch element may be at the midpoint of each of the four edges of the first metal patch element.

Further, the ratio of (i) the spacing between two adjacent metal patch elements in the K-band metal patch array and (ii) the spacing between two adjacent metal patch elements in the Ka-band metal patch array is $\sqrt{2}$:1.

Further, the K-band filter and Ka-band filter are not closed. They comprise parallel or series metal microstrip lines (which may be formed or modified by arbitrary bending). The width(s) of the metal microstrip lines in the K-band filter are not equal to the width(s) of the metal microstrip lines in the Ka-band filter. The K-band feeder is also a non-closed structure, comprising or consisting of an L-shaped structure (having a short side and a long side) and a V-shaped structure. The short side of the L-shaped structure is connected with one side of the V-shaped structure. The L-shaped structure and V-shaped structure are made, for example, by bending metal microstrip lines.

The beneficial effects of the present invention include the following.

The present invention concerns a multi-frequency, common-aperture, circularly polarized phased array antenna, and includes two specific implementations and/or embodiments. By configuring an inter-frequency decoupling structure or an independent filtering structure for each frequency unit, the common-aperture feature is fulfilled. The improvement of the isolation between different frequency units of the phased array antenna effectively reduces the overall size and makes the multi-frequency, common-aperture, circularly polarized phased array antenna more practical.

DESCRIPTION OF DRAWINGS

FIGS. 3A-F show six types of endfire circularly polarized antenna elements in Example 1.

FIG. 4 show crossband decoupling structures and decoupling principles.

EMBODIMENTS

The invention will be further explained with regard to the accompanying drawings and the following embodiments.

Example 1

Figure 1:
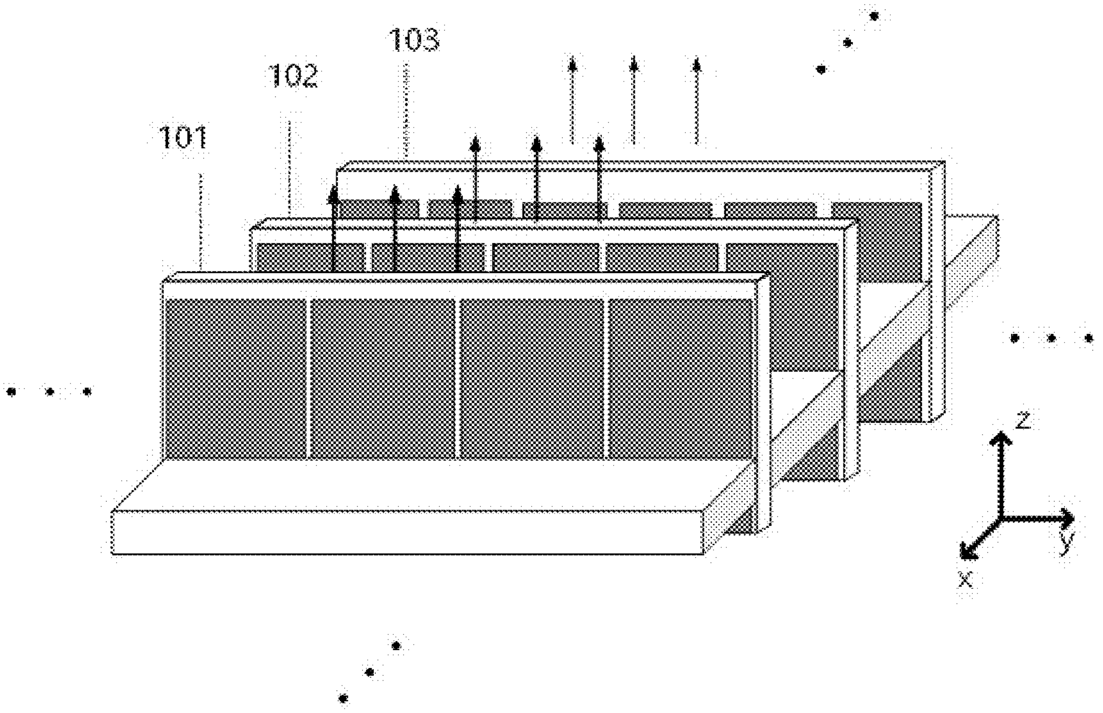
FIG. 1 shows the topology of a triple-band, shared-aperture, endfire circularly polarized phased array antenna in Example 1.

FIG. 1 shows the topology of a triple-band, shared-aperture, circularly polarized phased array antenna. The triple-band, shared-aperture, circularly polarized phased array antenna comprises a plurality of linear array groups, arranged periodically along the x direction. Each linear array group comprises three types of circularly polarized endfire linear arrays 101, 102 and 103 along the x direction. Each array group is spaced from the adjacent array group(s) by the same distance. The three types of circularly polarized endfire linear arrays 101, 102 and 103 are integrated to construct a shared-aperture antenna.

The circularly polarized linear array comprises a plurality of circularly polarized endfire antenna elements, arranged along the y direction. The antenna elements radiate (e.g., transmit, broadcast or reflect radiation) in the z direction.

A rectangular metal block is between adjacent circularly polarized endfire linear arrays, as a crossband decoupling structure. Two opposite sides or ends of the rectangular metal blocks are connected to or bonded with the circularly polarized endfire linear arrays to decouple the horizontal polarization components.

Figure 2:
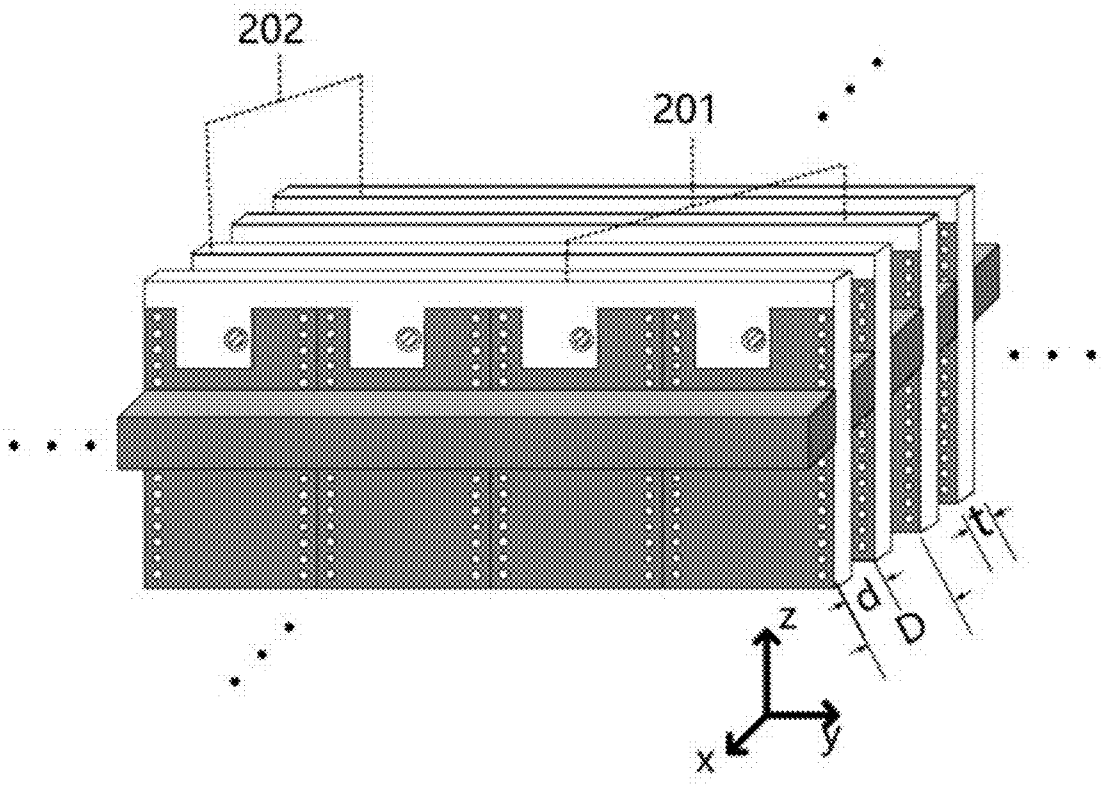
FIG. 2 shows a dual-band, shared-aperture, endfire circularly polarized phased array antenna in Example 1.

FIG. 2 shows a dual-band, shared-aperture, circularly polarized phased array antenna. The prototype shown in FIG. 2 comprises eight lower band I-type circularly polarized antenna linear arrays 201 and eight higher band II-type circularly polarized antenna linear arrays 202. The two types of circularly polarized antenna linear arrays are alternately arranged at a distance of d=2.5 mm apart along the x direction. The circularly polarized antenna linear arrays operating in the same band have a period D=5 mm. Both the I-type and II-type circularly polarized antenna linear arrays have the same thickness t=1.5 mm. Rectangular metal blocks are between adjacent circularly polarized endfire linear arrays as crossband decoupling structures. The metal blocks have a length of 40 mm along the y direction, a width of 1 mm along the x direction, and a height of 2 mm along the z direction. Two opposite sides of the rectangular metal blocks are bonded with or connected to the adjacent circularly polarized endfire linear arrays for horizontally polarized decoupling.

Two types of circularly polarized endfire linear arrays are integrated into one antenna aperture (e.g., in FIG. 2). Each circularly polarized endfire linear array operating or emitting radiation in a different band has an independent feeding network and an independent working state, and can perform different tasks at the same time. The I-type circularly polarized endfire antenna linear arrays each comprise eight I-type circularly polarized endfire antenna elements, which are configured periodically along the y direction. As shown in FIG. 3B, the I-type circularly polarized endfire antenna element is centrosymmetric (or substantially centrosymmetric) around its z-direction central axis. The circularly polarized antenna elements each comprise a rectangular dielectric substrate, a top metal layer covering the top face of the rectangular dielectric substrate, a bottom metal layer covering the bottom face of the rectangular dielectric substrate, and two columns of metal via arrays 304. The rectangular dielectric substrate has a length $h_m$=12 mm (FIG. 3D) and a width $W_k$=7.5 mm (FIG. 3B). The bare substrate area 303 has the same width as the rectangular dielectric substrate, but may be elongated (in part) along the z direction. A "bare substrate" means there is no metal layer covering the substrate in that location or area. The length of the bare substrate is $h_k$=1.1 mm (FIG. 3B). The two columns of metal via arrays 304 are configured on opposite sides of the circularly polarized endfire antenna element. The extension direction of each metal via array is along the z direction. The function of the metal via array is to electrically connect the top metal layer and the bottom metal layer. The rectangular dielectric substrate, the top metal layer, the bottom metal layer, and the metal via arrays together constitute a substrate integrated waveguide. The top metal layer and the bottom metal layer both have a rectangular notch 302 at an end in the z direction. The rectangular notches may have a width $G_k$=3.4 mm (FIG. 3B) and a depth of 3.2 mm. The overlapping parts of the notches 302 (or projections) in the top and bottom metal layers on opposite surfaces of the rectangular dielectric substrate along the y direction is 1.5 mm (in width). A through hole with a diameter $D_{hole}$=1 mm is in the center of the overlapping notch/projection area, and is configured to hold a metal dowel (which may comprise a rivet, pin, bolt or screw) with a diameter of 0.8 mm.

In the circularly polarized end-fire antenna of this embodiment, the horizontal polarization component is generated by radiation of or from the dipole-like structure formed by a residual metal arm after the rectangular slot is configured, and the vertical polarization component is generated by radiation of or from the substrate integrated waveguide. The amplitude of the two components is equal, and when the phase difference is 90 degrees, circularly polarized radiation waves are generated. However, when the substrate integrated waveguide is thin, the vertical polarization component can hardly reach the same amplitude level with that of the horizontal polarization component. Therefore, circular polarization may be difficult to realize. To solve this problem, the metal dowel is configured to enhance the vertical polarization component, which enables circular polarization even if the antenna element is thin. This also contributes a reduction in the density of the antenna array.

The II-type circularly polarized endfire antenna array comprises twelve II-type circularly polarized endfire antenna elements, arranged periodically along the y direction. As shown in FIG. 3A, the differences between the I-type and the II-type circularly polarized endfire antenna elements are generally in the structure sizes. For the II-type circularly polarized endfire antenna elements, the width of the rectangular substrate $W_{ka}$ is 5 mm, the length of the elongated substrate area $h_{ka}$ is 1 mm, the width of the rectangular notch $G_{ka}$ is 2 mm, and the overlapping part of the two notches or projections on opposite sides of the substrate is 0.5 mm (in width).

Another four types of circularly polarized endfire antenna elements are also disclosed in this example.

FIG. 3C shows a III-type circularly polarized endfire antenna element. Compared with II-type circularly polarized endfire antenna elements, III-type circularly polarized endfire antenna elements have a longitudinal rectangular stripe 305 of 0.8 mm length and 0.2 mm width in the bare or elongated area of the rectangular substrate. The long edges of the longitudinal rectangular stripe 305 are parallel to the radiation direction. One of the short edges is connected to the metal layer.

FIG. 3D shows a IV-type circularly polarized endfire antenna element. Compared with II-type circularly polarized endfire antenna elements, IV-type circularly polarized endfire antenna elements have a latitudinal rectangular stripe 306 of 1.8 mm length and 0.2 mm width in the bare or elongated area of the rectangular substrate. The long edges of the latitudinal rectangular stripe 306 are orthogonal to the radiation direction. The latitudinal rectangular stripe is at a distance of 0.2 mm away from the metal layer.

The III-type and the IV-type circularly polarized endfire antenna elements can effectively improve the beam width by loading the rectangular stripes. The III-type and the IV-type circularly polarized endfire antenna elements can also effectively compensate circular polarization deterioration when the antenna array scans to a large scan angle.

FIG. 3E shows a V-type circularly polarized endfire antenna element. Compared with II-type circularly polarized endfire antenna element, the V-type circularly polarized endfire antenna element includes an L-shaped meta-material array 307 in the bare or elongated area of the rectangular substrate. The distance between the L-shaped meta-material array and the metal layer is 0.4 mm. The L-shaped meta-material array is configured to reduce the mutual coupling among the antenna elements in the same antenna linear array, which may relieve the gain loss and active voltage standing-wave ratio deterioration when the antenna array scans to a large scan angle.

FIG. 3F shows a VI-type circularly polarized endfire antenna element. Compared with II-type circularly polarized endfire antenna elements, VI-type circularly polarized endfire antenna elements have a rectangular notch with a width Gs of 1 mm, the projections/notches on opposite sides of the substrate do not overlap and have a width of 0.2 mm, and there is no metal dowel. The VI-type circularly polarized endfire antenna element adopts a horizontal polarization component cancellation method. By reducing the width of the rectangular notch/projection, metal arms are formed on opposite sides of the rectangular notch/projection that form two dipole-like structures. According to the current symmetry on the wall of the substrate integrated waveguide, the horizontal polarization components radiated by the two dipole-like structures cancel each other out, reducing the amplitude of the horizontal polarization components to match the weaker vertical polarization components radiated by the thinner substrate integrated waveguide, thus resulting in circularly polarized radiation.

Figure 4A:
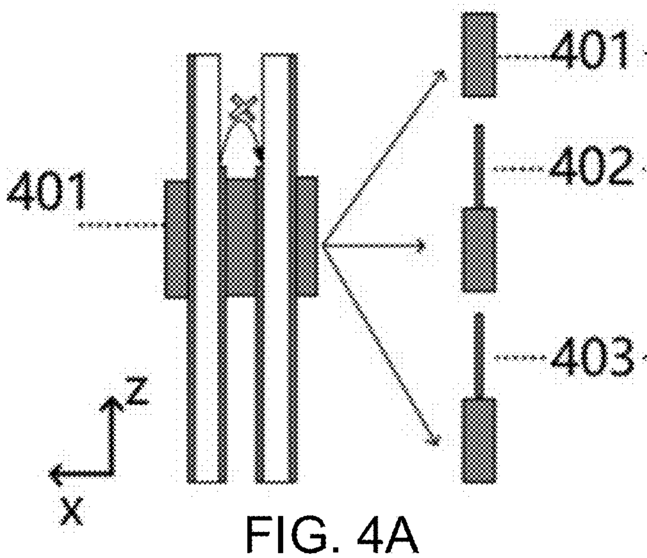
FIG. 4A shows a decoupling principle for the horizontal polarization component.
Figure 4B:
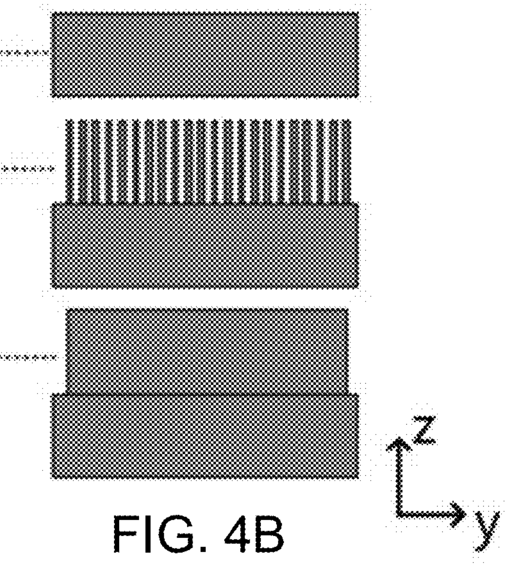
FIG. 4B shows three types of crossband decoupling structures.

FIGS. 4A-B show crossband decoupling structures and decoupling principles. FIG. 4A shows a decoupling principle of the horizontal polarization component. In this example, a crossband coupling path is set up by the low or innermost edges of the rectangular notches on the circularly polarized endfire antenna elements. As we know that electric current close to a perfect conductor does not radiate, with the rectangular metal block 401 close to the low/innermost edges of the rectangular notches, the current on the low edges will be fastened and not radiate. This eliminates a primary source of cross band coupling and decouples the horizontal polarization component.

FIG. 4B shows three types of decoupling structures. The first type is a rectangular metal block 401. The second type adds a metal grating 402 on the rectangular metal block 401. The third type adds a metal slab or sheet 403 on the rectangular metal block 401. By adding the metal slab/sheet or grating, the coupling path of the horizontal polarization component can be further shortened, which improves the decoupling effect.

Figure 4C:
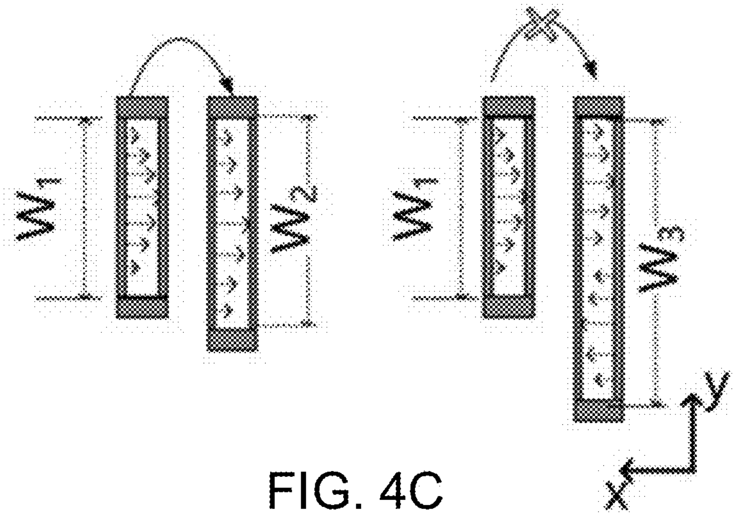
FIG. 4C shows a decoupling principle for the vertical polarization component.

FIG. 4C shows a decoupling principle of the vertical polarization components. The orthogonality of odd and even modes in substrate integrated waveguides is used to realize the decoupling. By adjusting the width (i.e., $W_1$=3.6 mm, $W_2$=5.6 mm, and $W_3$=6.8 mm) of the substrate integrated waveguide, the waveguides of circularly polarized end-fire antenna elements with different frequencies have different internal working modes and cannot excite each other, so as to achieve decoupling of vertically polarized components.

Figure 5A:
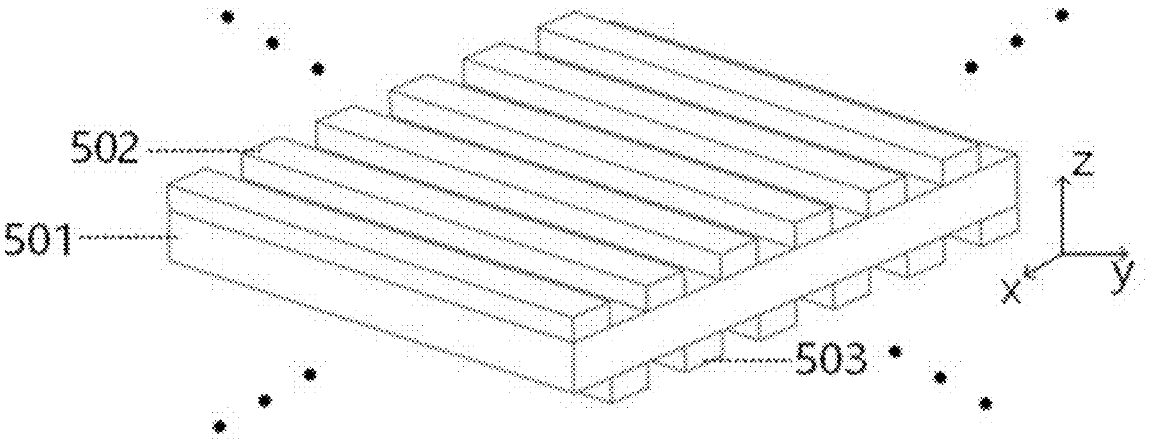
FIGS. 5A-B respectively show a three-dimensional view of the dielectric radome and a position of the dielectric radome.
Figure 5B:
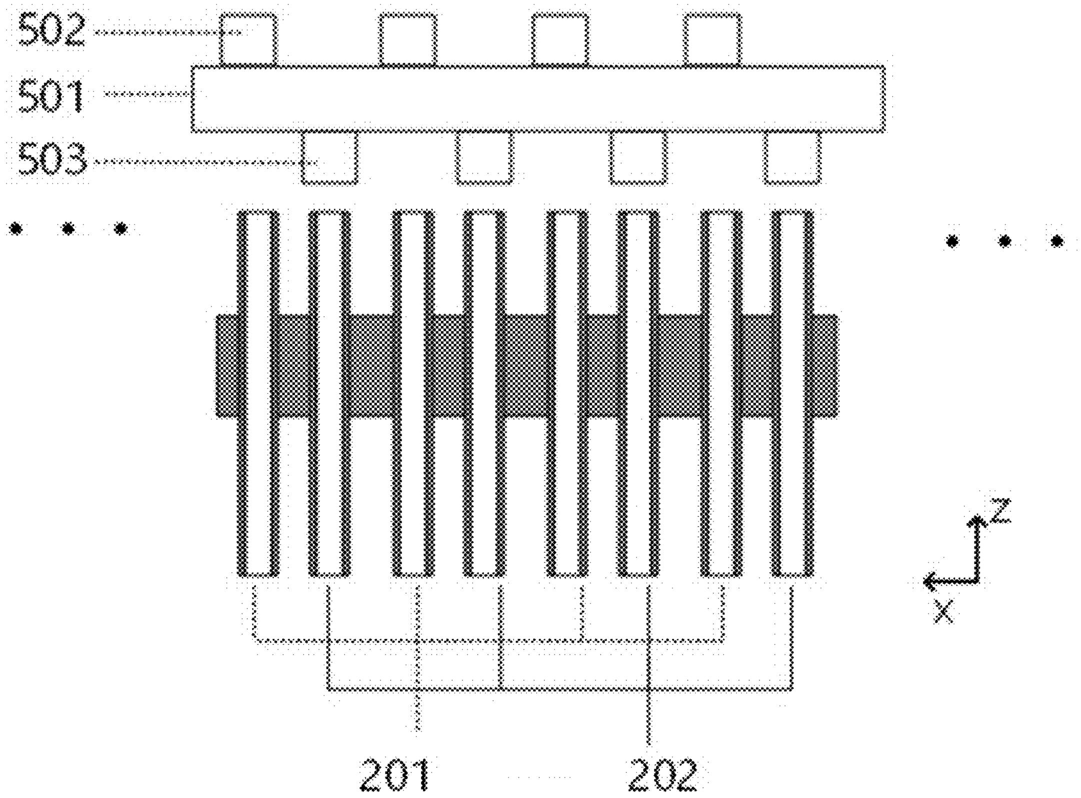

FIG. 5 shows a dielectric radome, comprising a central dielectric slab 501, a and plurality of upper face bulges or ridges 502 and a plurality of lower face bulges or ridges 503 on opposite faces of the middle dielectric slab. The upper face bulges/ridges 502 and the lower surface bulges/ridges 503 are distributed periodically and alternately. The thickness of the dielectric slab 501 is 2 mm, the upper face bulges or ridges 502 and the lower face bulges or ridges 503 have a 1.5 mm length and a 1.5 mm height. The distance between two adjacent bulges or ridges is 5 mm. The dielectric radome is placed adjacent to the antenna array along the direction of radiation. The bulges or ridges 502 and 503 are configured to enhance the transmission performance of the dielectric radome even in the near field region, which will reduce the height of the antenna system effectively.

Example 2

Figure 6:
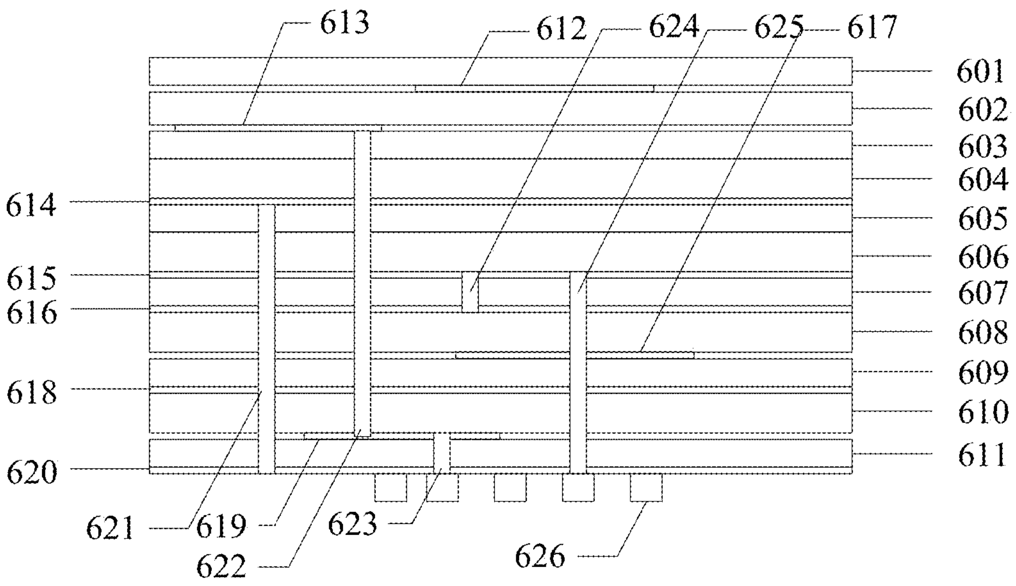
FIG. 6 shows the overall profile of a shared-aperture, circularly polarized phased array antenna in Example 2.

In this example, a dual-band shared-aperture, phased array antenna is disclosed, whose overall height is about 3 mm. It is less than half of the wavelength corresponding to the highest frequency (e.g., of radiation emitted, broadcast or reflected by the phased array antenna), and can be used in a low-profile, planarization communication platform. Its structure is shown in FIG. 6, including a plurality of dielectric substrate layers, a K-band metal patch array structure 612, a Ka-band metal patch array structure 613, a K-band filtering structure and a Ka-band filtering structure.

The plurality of dielectric substrate layers include a first metal ground 620, a first dielectric substrate layer 611, a second dielectric substrate layer 610, a second metal ground 618, a third dielectric substrate layer 609, a fourth dielectric substrate layer 608, a third metal ground 616, a fifth dielectric substrate layer 607, a fourth metal ground 615, a sixth dielectric substrate layer 606, a seventh dielectric substrate layer 605, a fifth metal ground 614, an eighth dielectric substrate layer 604, a ninth dielectric substrate layer 603, a tenth dielectric substrate layer 602 and a eleventh dielectric substrate layer 601, successively from top to bottom;

A ball grid array (BGA, comprising an array of metal [e.g., solder] balls) 626 is configured to connect the lower surface of the first metal ground 620 to other metal layers in the multilayer dielectric substrate and/or to a PCB or chip (e.g., integrated circuit; not shown). The first metal ground 620 (or a surface thereof) is in contact with a first metal via 621 and a second metal via 625. The fifth metal ground 620, the fourth metal ground 615, the third metal ground 616 and the second metal ground 618 are electrically connected with each other by the first metal via 621. In addition, the first metal via 621 may be a shield of a Ka-band antenna, which weakens the coupling of the electromagnetic energy of the same or different frequencies between the plurality of layers. The BGA 626 (or one ball thereof), the fourth metal ground 615, the third metal ground 616 and the second metal ground 618 are electrically connected with each other by the second metal via 625, which may be the signal transmission line for a K-band antenna.

The metal layer of the Ka-band power divider 619 is between the first dielectric substrate layer 611 and the second dielectric substrate layer 610. In this example, the power divider 619 contains a plurality of bent microstrip lines, which can evenly divide the input signal into two signals, each having equal power. Due to the length difference of the microstrip lines in the two signals, two output signals with a phase difference of 90° are generated, and are fed (e.g., transmitted or broadcast) to the circularly polarized antenna. A third metal via 622 is in contact with the metal layer of the Ka-band power divider 619, and a fourth metal via 623 is in contact with and below the metal layer of the power divider 619. A Ka-band metal patch array 613 is fed (e.g., in electrical communication with other conductive structures) through the third metal via 622. The Ka-band metal patch array 613 is connected with the BGA 626 by the fourth metal via 623.

A fifth metal via 624 is in contact with the third metal ground 616 and the fourth metal ground 615. The fifth metal via 624 electrically connects the third metal ground 616 and the fourth metal ground 615, and improves the efficiency of signal radiation in the K-band.

Figure 8:
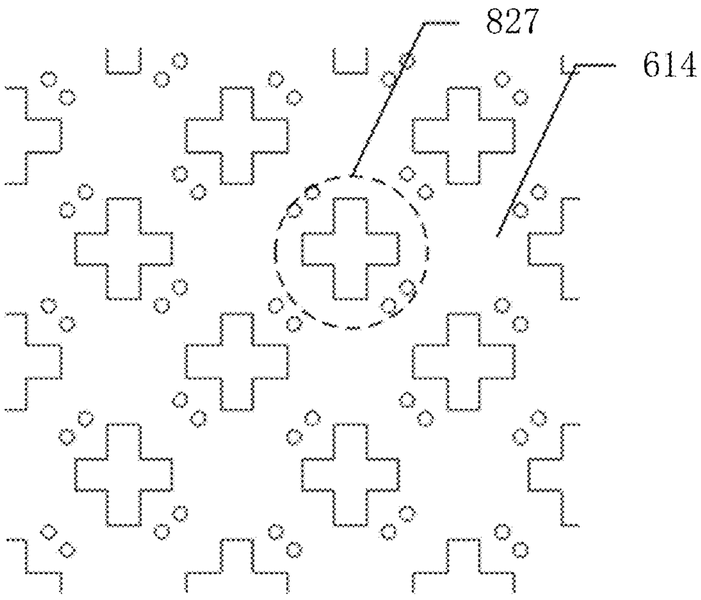
FIG. 8 shows a top view of the fifth metal ground in Example 2.
Figure 9:
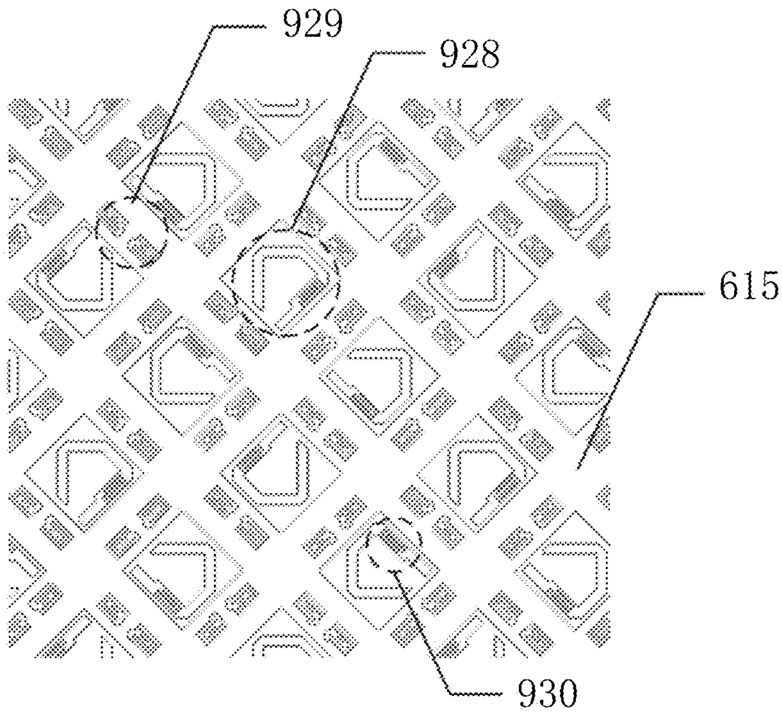
FIG. 9 shows a top view of the fourth metal ground in Example 2.

The fourth metal ground 615 includes a K-band feeder 928 (FIG. 9). The K-band feeder 928 is a bent metal microstrip line. One end of the metal microstrip line bends at an angle of about 90° (e.g., in the shape of an "L") along the length direction, and then bends again at a larger angle (e.g., about 135°, in the shape of a "V"). The feeder 928 feeds through cross slots 827 (FIG. 8) in the fifth metal ground 614. The angle between the of the "V" is 130°~140°. The bends in the K-band feeder 928 are in the same direction (e.g., inward), and the shape approaches a diamond or square.

Figure 7:
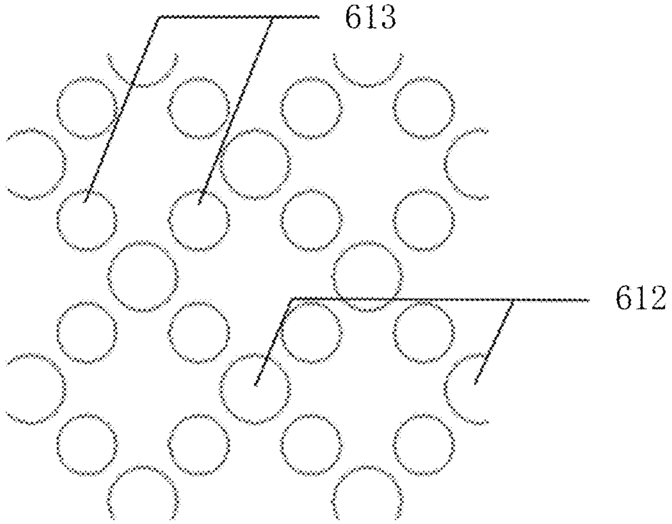
FIG. 7 shows a top view of a K-band metal patch array and a Ka-band metal patch array in Example 2.

FIG. 8 shows the cross slots 827 in the fifth metal ground 614, configured directly below the K-band metal patch array 612 (FIG. 7). Each cross slot 827 corresponds one-to-one to a metal patch 612 in the K-band metal patch array.

The sixth metal layer 617 is on the third dielectric substrate layer 609, and the second metal via 625 is in contact with the sixth metal layer 617.

The K-band metal patch array 612 is on the tenth dielectric substrate layer 602, and the Ka-band metal patch array 613 is below the tenth dielectric substrate layer 602. The third metal via 622 connects the Ka-band metal patch 613 with the Ka-band power divider metal layer 619, and the projection of each patch in the Ka-band metal patch array 613 on the tenth dielectric substrate layer 602 does not coincide with the projection of each patch in the K-band metal patch array 612 on the tenth dielectric substrate layer 602. The K-band metal patch array 612 comprises a plurality of identical or substantially identical metal patch elements with a fixed spacing therebetween. The spacing between adjacent metal patch elements (e.g., in the K-band metal patch array 612 and/or the Ka-band metal patch array 613) is greater than zero. The center points of 4 adjacent metal patches (e.g., in the K-band metal patch array 612 and/or the Ka-band metal patch array 613) may be represented by the 4 vertices of a square. The Ka-band metal patch array 613 and the K-band metal patch array 612 may be configured identically or substantially identically.

In the Ka band metal patch array 613, the distance between two adjacent metal patch elements is smaller than that between two adjacent metal patch elements in the K-band metal patch array 612. In this example, the spacing between two adjacent metal patch elements in K-band metal patch array 612 is 7 mm, and the spacing between two adjacent metal patch elements in Ka-band metal patch array 613 is 4.95 mm. In other application scenarios with the same band, the spacing between metal patch elements in the two frequency bands can be adjusted according to requirements. The adjustment distance should be controlled within 10% of the original distance.

As shown in FIG. 7, the projection of the K-band metal patch array 612 on the tenth dielectric layer 602 is in the same region as that of the Ka-band metal patch array 613 on the tenth dielectric layer 602. The patch element of K-band metal patch array 612 is taken as a first patch element, and the patch element of Ka-band metal patch array 613 is taken as a second patch element. The second metal patch element is nested within the first metal patch element, and the four vertices of the second metal patch element square are located at the midpoint of each of the four edges of the first metal patch element square. The ratio between the spacing between two adjacent metal patch elements in the K-band metal patch array 612 and the spacing between two adjacent metal patch elements in the Ka-band metal patch array 613 is $\sqrt{2}$:1. In this example, each metal patch is circular, and its diameter is half of the medium wavelength (e.g., in the K band or the Ka band). In the array, a probe feeder or a coupled feeder may be present to better radiate the electromagnetic energy.

Figure 10:
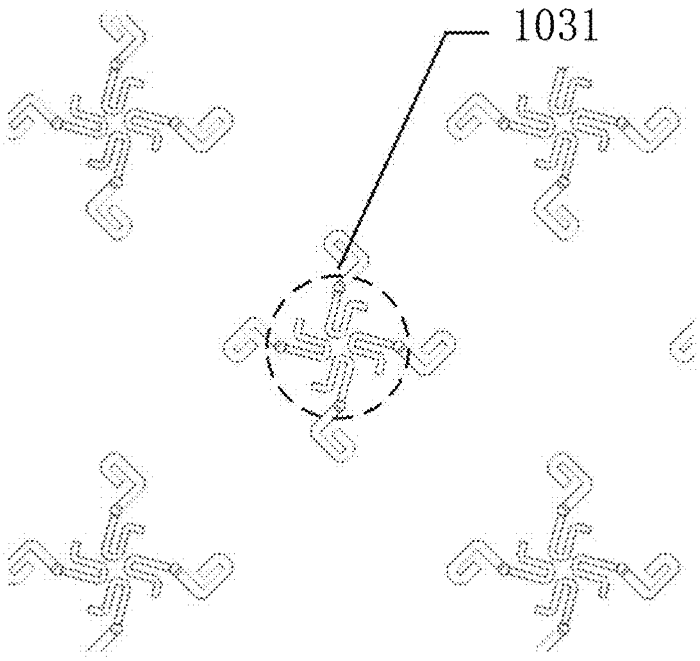
FIG. 10 shows a top view of the sixth metal ground in Example 2.
Figure 11:
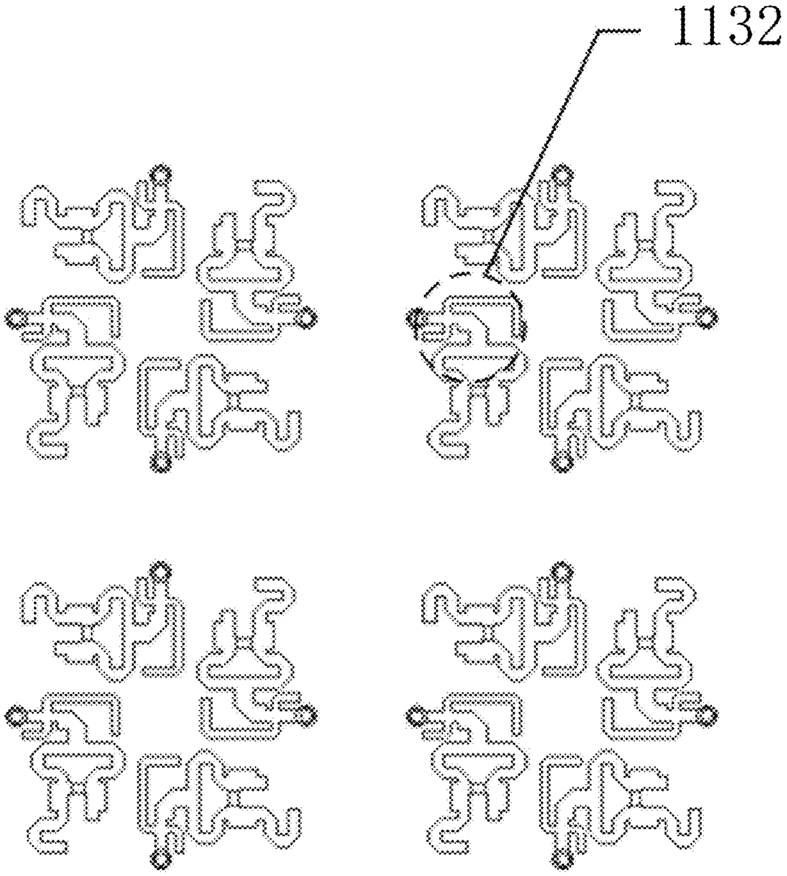
FIG. 11 shows a top view of the Ka-band power divider metal layer in Example 2.

The K-band filter may comprise a first K-band filter 929 (FIG. 9) and a second K-band filter 1132 (FIG. 11). The Ka-band filter may comprise a first Ka-band filter 930 (FIG. 9) and a second Ka-band filter 1031 (FIG. 10). To further improve the isolation, in this example, a non-closed structure made by arbitrarily bending parallel or series metal microstrip lines may be used for filtering, and metal microstrip lines with different line widths are preferentially used in the two different frequency bands. In order to further reduce the overall size and improve the isolation, a parallel structure was selected for the first Ka-band filter (except, possibly, for an internal series structure in each filter element). The first Ka-band filter 930 comprises an "L" or "U" shaped structure (e.g., at least partially similar to that of the K-band feeder 928), optionally distal from a microstrip line of the "V" shape structure. The first K-band filter 929 and the first Ka-band filter 930 are in the fourth metal ground 615 in the same layer, and they are not in contact, as shown in FIG. 9. The second K-band filter 1132, as shown in FIG. 11, is in the metal layer of the Ka band power divider 619. The second Ka band filter 1031, as shown in FIG. 10, comprises a plurality of microstrip lines (which may be identically and at least somewhat arbitrarily bent) in parallel, and is in the sixth metal layer 617.

In this example, the Ka-band metal patch array 613 is fed directly by the Ka-band power divider 619 connected by the third metal via 622, and radiates Ka-band circularly polarized electromagnetic waves. The K-band electromagnetic wave is coupled by the metal microstrip line 928 through the cross slot 827 in the metal ground 614, to the K-band metal patch array 612, which may radiate the K-band circularly polarized electromagnetic wave. The first K-band filter 929 and the second K-band filter 1132 are etched in the fourth metal ground 615 and the metal layer 619 of the Ka-band power divider, respectively. The overall size of these filters is only about 0.1 times the wavelength. After connecting with the third metal via 622, the cross-frequency isolation can be improved (e.g., by the first K-band filter 929 and the second K-band filter 1132) by about 20 dB. The first Ka-band filter 930 and the second Ka-band filter 1031 are etched in the K-band feeders 928 and the sixth metal layer 617, respectively, and connected with the second metal via 625. The overall size of these filters is only about 0.3 times the wavelength, and no additional space is occupied in the transverse direction. The cross-frequency isolation is also improved (e.g., by the first Ka-band filter 930 and the second Ka-band filter 1031) by about 20 dB.

It should be noted that the filters, the feeders and the Ka-band power dividers configured on the upper surface of the metal layers in Example 2 are all at the same level as the metal layers in which they are located.

Figure 12:
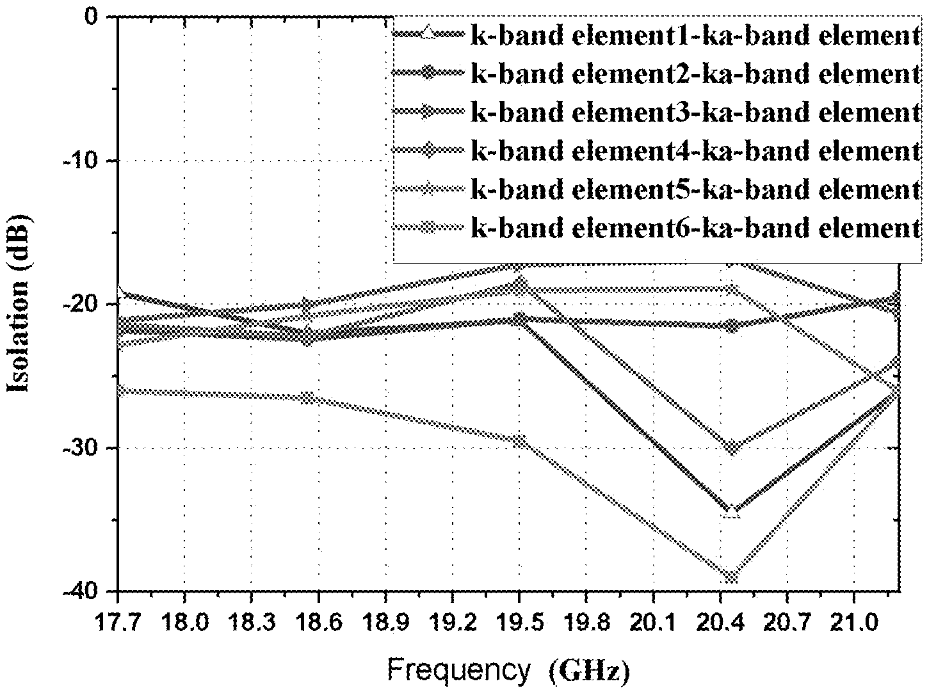
FIG. 12 is a graph showing the coupling of adjacent K-/Ka-band channels when the phased array antenna in Example 2 is not loaded with the K-band filter.

FIG. 12 is a graph that shows the coupling of adjacent K-/Ka-band channels when the phased array antenna is not loaded with (e.g., does not contain) the K-band filter in Example 2. There is a single high-frequency antenna element and 6 adjacent different low-frequency antenna elements in the testing done in FIGS. 12-15. As shown in FIG. 12, the isolation is better than 17 dB.

Figure 13:
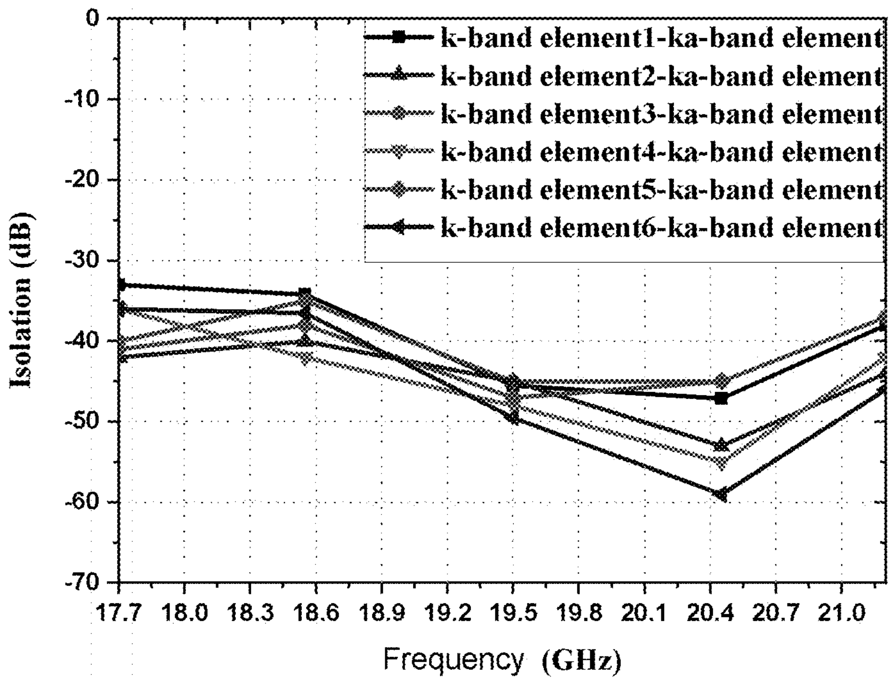
FIG. 13 is a graph showing the coupling of adjacent K-/Ka-band channels when the phased array antenna in Example 2 is loaded with the K-band filter.

FIG. 13 is a graph that shows the coupling of adjacent K-/Ka-band channels when the phased array antenna is loaded with the K-band filter in Example 2. As shown in FIG. 13, the isolation is better than 33 dB in the range of 17.7-21.2 GHz, and better than 40 dB in the range of 19-20.8 GHz. Relative to the phased array antenna not loaded with the K-band filter (FIG. 12), isolation by the phased array antenna loaded with the K-band filter improved generally by about 15 to 25 dB.

Figure 14:
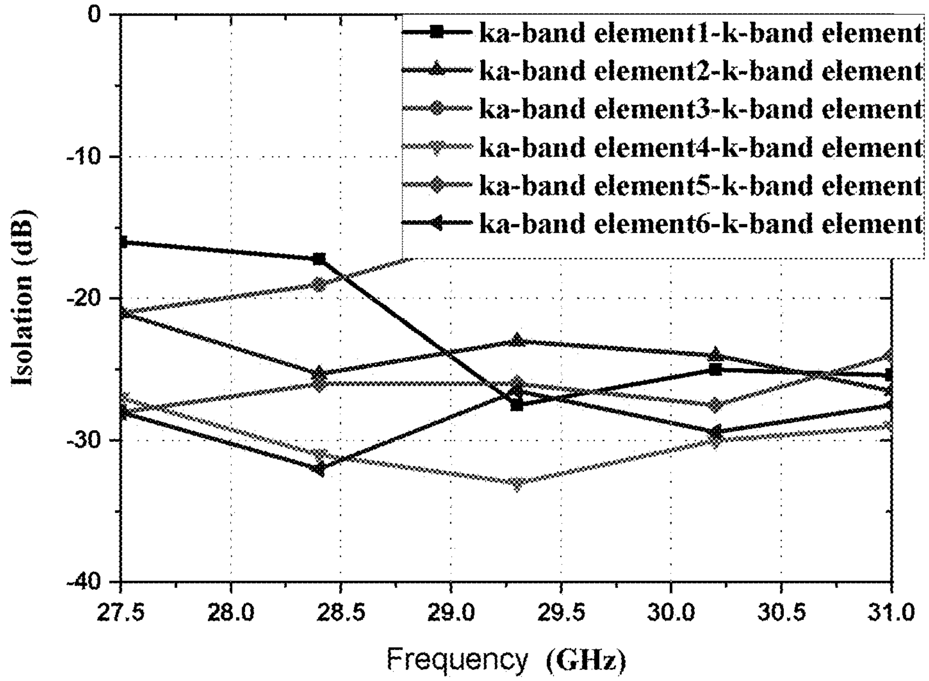
FIG. 14 is a graph showing the coupling of adjacent K-/Ka-band channels when the phased array antenna in Example 2 is not loaded with the Ka-band filter.

FIG. 14 is a graph that shows the coupling of adjacent K-/Ka-band channels when the phased array antenna is not loaded with the Ka-band filter in Example 2. As shown in FIG. 14, the isolation is better than 15 dB.

Figure 15:
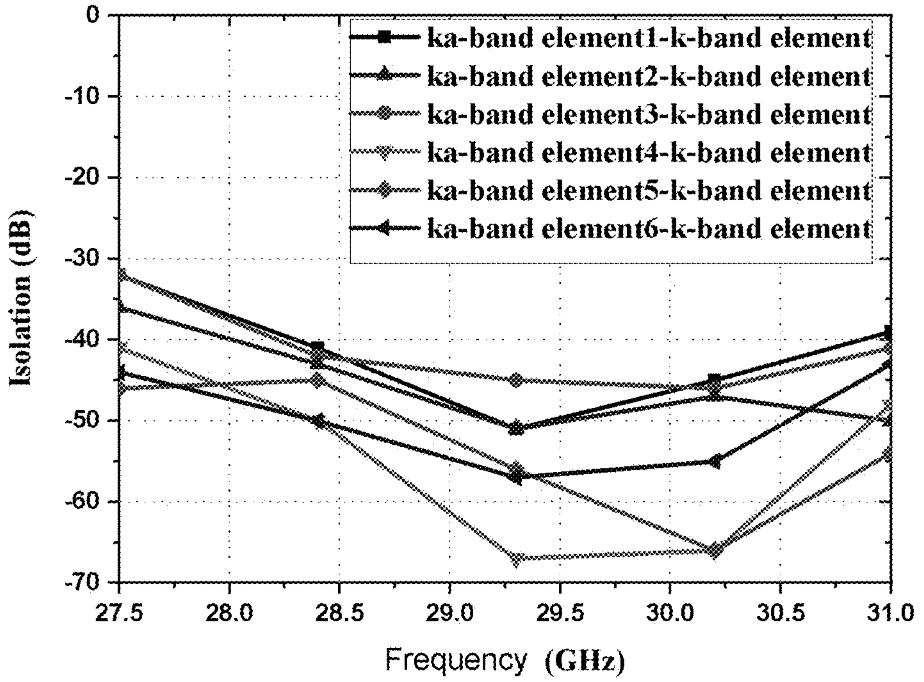
FIG. 15 is a graph showing the coupling of adjacent K-/Ka-band channels when the phased array antenna in Example 2 is not loaded with the Ka-band filter.

FIG. 15 is a graph that shows the coupling of adjacent K-/Ka-band channels when the phased array antenna is loaded with the Ka-band filter in Example 2. As shown in FIG. 15, the isolation is better than 33 dB in the range of 27.5-31 GHz, better than 35 dB in the range of 27.5-31 GHz. Relative to the phased array antenna not loaded with the Ka-band filter (FIG. 14), isolation by the phased array antenna loaded with the K-band filter improved generally by about 20 to 30 dB.

The embodiments of the present invention have been described here with reference to specific examples. Those skilled in the art can easily understand the advantages and effects of the present invention by the contents disclosed in these embodiments. The present invention may also be implemented or applied through other different specific embodiments. The various details in these embodiments can also be modified or changed on the basis of different opinions or applications without departing from the spirit of the present invention.

What is claimed is:

1. A multi-band, shared-aperture, circularly polarized phased array antenna, comprising:

a dielectric substrate, a K-band metal patch array, a Ka-band metal patch array, a K-band filter and a Ka-band filter, wherein the dielectric substrate includes, in succession, a first metal ground, a first dielectric substrate layer, a second dielectric substrate layer, a second metal ground, a third dielectric substrate layer, a fourth dielectric substrate layer, a third metal ground, a fifth dielectric substrate layer, a fourth metal ground, a sixth dielectric substrate layer, a seventh dielectric substrate layer, a fifth metal ground, an eighth dielectric substrate layer, a ninth dielectric substrate layer, a tenth dielectric substrate layer and an eleventh dielectric substrate layer;

a ball grid array (BGA) configured to connect the first metal ground to an external surface or device;

a first metal via and a second metal via electrically connected to the first metal ground, wherein the fifth metal ground, the fourth metal ground, the third metal ground and the second metal ground are electrically connected by the first metal via, and the BGA, the fourth metal ground, the third metal ground and the second metal ground are electrically connected by the second metal via;

a Ka-band power divider comprising a first metal layer between the first dielectric substrate layer and the second dielectric substrate layer;

a third metal via and a fourth metal via electrically connected to the Ka-band power divider, wherein the Ka-band metal patch array is fed by the third metal via and is connected to the BGA by the fourth metal via;

a fifth metal via electrically connected to the third metal ground and the fourth metal ground;

a K-band feeder in the fourth metal ground;

a second metal layer on the third dielectric substrate layer, wherein the second metal via is electrically connected to the second metal layer; wherein:

the K-band metal patch array and the Ka-band metal patch array are on opposite surfaces of the tenth dielectric substrate layer, and the Ka-band metal patch array matches the K-band metal patch array; and the third metal via connects the Ka-band metal patch with the Ka-band power divider.

2. The multi-band, shared-aperture, circularly polarized phased array antenna in claim 1, wherein the K-band feeder feeds K-band signals or radiation through a plurality of cross slots in the fifth metal ground, the cross slots are directly below the K-band metal patch array, and the cross slots correspond one-to-one to the metal patches in the K-band metal patch array.

3. The multi-band, shared-aperture, circularly polarized phased array antenna in claim 1, wherein the K-band filter comprises a first K-band filter in the second metal ground, the second metal layer, the third metal or the fourth metal ground, and a second K-band filter in the first metal layer of the Ka-band power divider.

4. The multi-band, shared-aperture, circularly polarized phased array antenna in claim 3, wherein the Ka-band filter includes a first Ka-band filter in the K-band feeder and a second Ka-band filter in the second metal ground or the second metal layer.

5. The multi-band, shared-aperture, circularly polarized phased array antenna in claim 4, wherein when the first K-band filter is in the fourth metal ground, it does not contact with the K-band feeder or the second Ka-band filter.

6. The multi-band, shared-aperture, circularly polarized phased array antenna in claim 1, wherein each metal patch in the Ka-band metal patch array does not coincide with or overlap any metal patch in the K-band metal patch array.

7. The multi-band, shared-aperture, circularly polarized phased array antenna in claim 1, wherein the K-band metal patch array comprises a plurality of identical metal patch elements with a fixed spacing greater than zero therebetween.

8. The multi-band, shared-aperture, circularly polarized phased array antenna in claim 1, wherein each metal patch element in the K-band metal patch array comprises 4 metal patches having center points on 4 vertices of a square, the spacing between adjacent metal patches and between adjacent metal patch elements are identical or substantially identical, and the Ka-band metal patch array and K-band metal patch array are substantially identically configured.

9. The multi-band, shared-aperture, circularly polarized phased array antenna in claim 8, wherein the K-band metal patch array is in a same region as that of the Ka-band metal patch array, the 4 metal patches of the K-band metal patch array are the first patch element, the 4 metal patches of the Ka-band metal patch array are the second patch element, the second metal patch element is nested within the first metal patch element, and the four vertices of the second metal patch element are at the midpoint of each of the four edges of a square formed by the first metal patch element.

10. The multi-band, shared-aperture, circularly polarized phased array antenna in claim 9, wherein the ratio between the spacing between two adjacent first patch elements in the K-band metal patch array and the spacing between two adjacent second patch elements in the Ka-band metal patch array is $\sqrt{2}$: 1.

11. The multi-band, shared-aperture, circularly polarized phased array antenna in claim 1, wherein the K-band filter and Ka-band filter are not closed, each of the K-band filter and the Ka-band filter comprise parallel or series metal microstrip lines, the metal microstrip lines of the K-band filter have a width not equal to that of the metal microstrip lines of the Ka-band filter, the K-band feeder is a non-closed structure comprising a metal microstrip line with an L-shaped structure and a V-shaped structure therein, and the L-shaped structure has a short side connected with of the V-shaped structure.

* * * * *